July 4, 1967

D. K. SCHAEVE 3,329,887

BURST LENGTH PROPORTIONING SYSTEM FOR
CONTROLLING ELECTRIC POWER

Filed March 4, 1963

INVENTOR.
Donald K. Schaeve
BY Wolfe, Hubbard, Voit & Osann
ATTORNEYS

July 4, 1967
D. K. SCHAEVE
3,329,887
BURST LENGTH PROPORTIONING SYSTEM FOR
CONTROLLING ELECTRIC POWER
Filed March 4, 1963
2 Sheets-Sheet 2
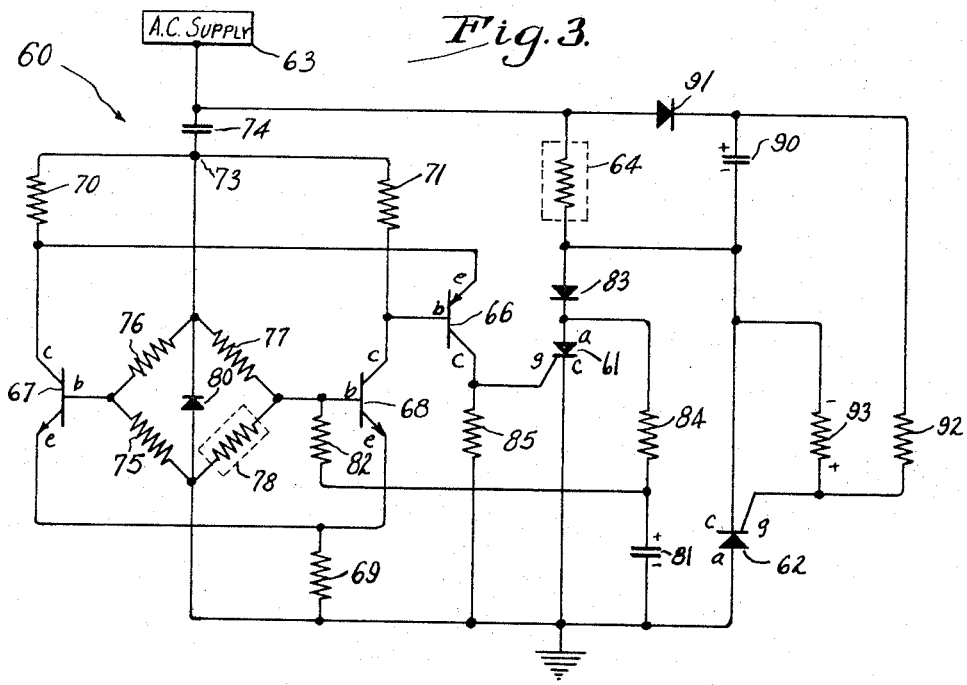
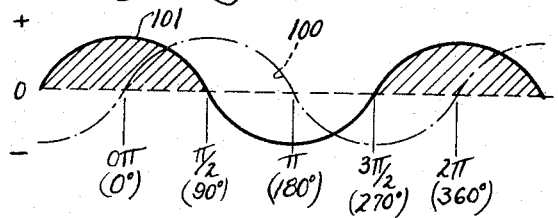
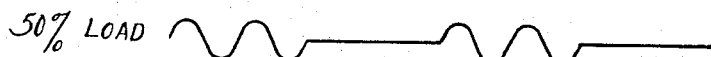
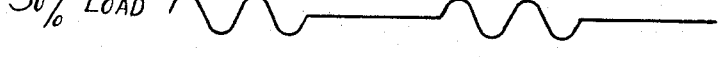
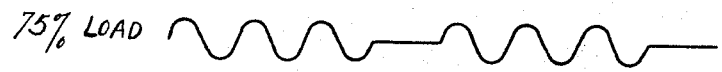
INVENTOR.
Donald K. Schaeve
BY Wolfe, Hubbard, Voit & Osann
ATTORNEYS United States Patent Office 3,329,887
Patented July 4, 1967

3,329,887
BURST LENGTH PROPORTIONING SYSTEM FOR
CONTROLLING ELECTRIC POWER
Donald K. Schaeve, Rockford, Ill., assignor to Barber-
Colman, Rockford, Ill., a corporation of Illinois
Filed Mar. 4, 1963, Ser. No. 262,452
6 Claims. (Cl. 323—22)

The present invention relates to a power proportioning circuit and more specifically to a circuit for controlling the periods of operation and nonoperation of a control device or the like.

In many modern control applications, it is often desirable or required that the A-C power applied to a dissipative load be modulated or smoothly controlled without jumps or discontinuities so that the power dissipated in the load is maintained at a desired level. Since the A-C supply characteristics and the load characteristics are usually fixed, or at least not adjustable, some device must be interposed to adjustably reduce, interrupt or otherwise modify the power applied to the load. In control operations, such as those for controlling the temperature of aircraft windshields by controlling the cycles during which A-C power is applied to a heater element or the like, it is desirable for the interposed device to provide smooth power control without the generation of severe electrical interference, such as radio noise, and the requirement for substantial filters as is common in present applications of this type. Many presently available controllers produce such severe electrical interference that filters larger than the controller itself are required. Accordingly, it has been desirable to provide a power proportioning circuit having no moving parts which overcomes the shortcomings of presently available controllers.

A primary object of this invention is to provide a power proportioning circuit for controlling the periods of supply and nonsupply of A-C power to a load or the like. In this connection, another object of this invention is to provide a power proportioning circuit having no moving parts for controlling the periods of operation and nonoperation of a control device or the like. A further object of this invention is to provide a power proportioning circuit of this type which has little distorting effect on the A-C supply wave form.

Another object of this invention is to provide a power proportioning circuit for controlling the operation of switching elements, such as silicon controlled rectifiers, in a manner such that triggering of the switching elements occurs only at zero of the A-C supply voltage wave form, regardless of the frequency, the wave form or the switching element characteristics. Accordingly, an object of this invention is to provide a power proportioning circuit of this nature for reliably controlling the operation of switching elements such that a longer life of the switching elements results. Another object of this invention is to provide a compact and reliable power proportioning circuit for controlling the operation of switching elements so that little electrical interference is generated thereby and the circuit may be readily utilized in conjunction with commercial and industrial applications, such as aircraft, telemetry, missile, satellite and space probe operations without the necessity for large filters.

Other objects and advantages of this invention will become apparent upon reading the attached detailed description and upon reference to the drawings, in which:

FIG. 3 is a schematic diagram of a second embodiment of a power proportioning circuit constructed in accordance with the principles of the invention;

FIG. 4 illustrates wave forms at selected positions in the circuit illustrated in FIG. 3;

FIG. 5 illustrates typical supply and load wave forms for the circuits illustrated in FIG. 3.

While the invention has been described in connection with certain preferred embodiments, it is to be understood that the invention is not to be limited to the disclosed embodiments but, on the contrary, the invention is intended to cover the various modifications and equivalent arrangements included within the spirit and scope of the appended claims.

Figure 1:
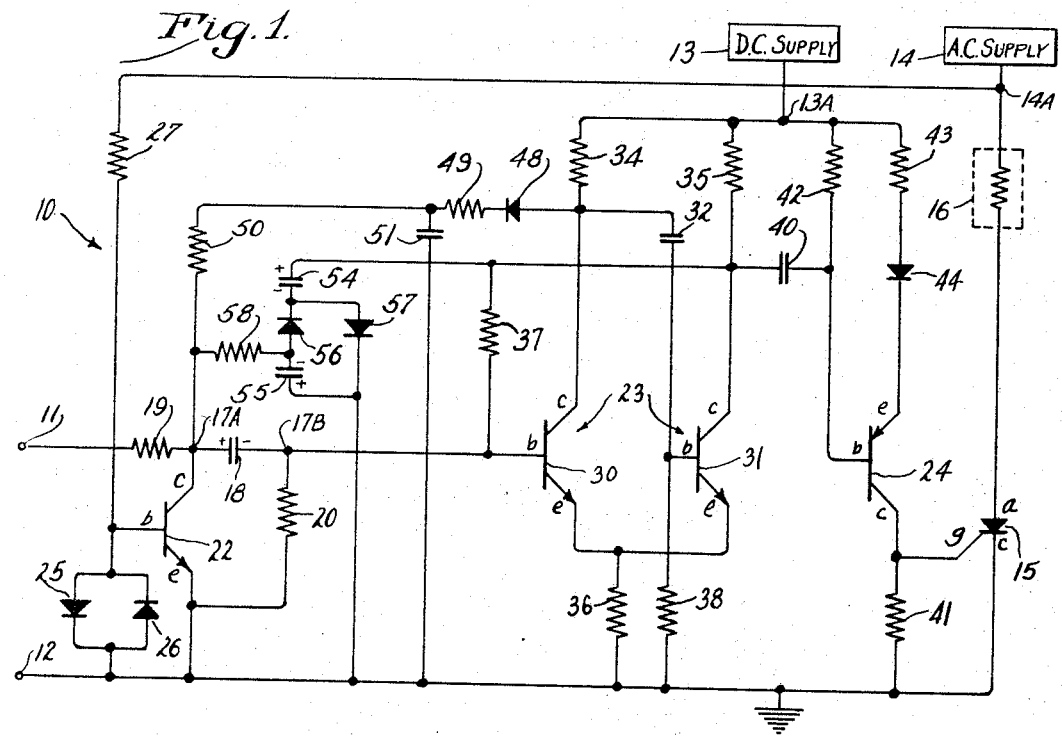
FIGURE 1 is a schematic diagram of a first embodiment of a power proportioning circuit constructed in accordance with the invention.

Referring now to the drawings and more specifically to FIG. 1, a power proportioning circuit 10 is illustrated therein for controlling the periods of supply and nonsupply of A-C power to a load or the like through a control switching element such as a silicon controlled rectifier, in accordance with the present invention. Further in accordance with the invention, the control switching element is triggered only at zero of the A-C power supply voltage, being rendered operative during a number of succeeding A-C cycles and nonoperative during a subsequent number of succeeding A-C cycles. The respective numbers of A-C cycles of operation and nonoperation are determined by the circuit characteristics and the amplitude of a condition responsive signal.

The power proportioning circuit 10 has a pair of input terminals 11 and 12 between which a condition responsive input signal is applied, in the present instance a positive D-C condition responsive signal being provided to indicate the detection of a condition such as the dropping of the temperature of an aircraft windshield below a prescribed level. Terminal 12 is a ground terminal common to a direct current (D-C) control voltage source 13 and an A-C power supply 14. The positive side of the D-C source 13 is connected to a control input terminal 13A and the ungrounded side of the A-C source 14 is applied to a power input terminal 14A. A static latching switch 15 is provided for controlling the flow of power from the A-C power input terminal 14A through a resistive load 16 such as a heater element or the like for controlling the temperature of an aircraft windshield, the static latching switch preferably being a silicon controlled rectifier having an anode, a cathode and a gate electrode, which are respectively designated as $a$, $c$ and $g$. The A-C power supply 14 and the resistive load 16 are connected in series with the anode-cathode circuit of the silicon controlled rectifier 15. If a positive triggering signal is applied to the gate electrode during the positive or forward half cycle of the A-C power supply voltage, the rectifier 15 is conditioned for conduction and current flows through the load 16 until the end of the positive half cycle. A subsequent triggering signal is required to condition the rectifier 15 for conduction during a succeeding positive half cycle. It should be noted that the output of the load 16 may be utilized to control the operation of any desired control device or the like.

In accordance with the present invention, the triggering signal is briefly applied to the gate electrode of the silicon controlled rectifier 15 during cycles when the A-C power supply voltage across the rectifier is changed from a value of negative polarity to a value of positive polarity, i.e., when the A-C power supply voltage is passing through zero. In response to the application of a positive condition responsive signal between the input terminals 11 and 12, a capacitor 18 is charged through charging resistors 19 and 20, the charge being such that a left-hand terminal 17A of the capacitor is positive with respect to a right-hand terminal 17B thereof as illustrated in FIG. 1. A clamping transistor 22 is associated with the capacitor 18 for clamping the terminal 17A to ground when the A-C power supply passes through zero phase angle so that a switch operating monostable multivibrator 23 (a one-shot multivibrator) associated therewith is rendered nonconductive. When the one-shot multivibrator 23 is rendered nonconductive, a triggering switch 24, illustrated as a transistor, is closed causing a positive trigging signal to be applied to the gate electrode of the silicon controlled rectifier 15.

The clamping transistor 22 is illustrated as a NPN transistor having a base, an emitter and a collector, respectively designated as $b$, $e$ and $c$, and the emitter-collector circuit thereof is connected between terminal 17A of the capacitor 18 and ground so that, when a positive signal is applied between the base and emitter, the clamping transistor is rendered conductive and terminal 17A is clamped to ground. Oppositely poled diodes 25 and 26 are connected in parallel between the base and emitter of the clamping transistor, and the base is connected to the A-C power supply input terminal 14A through a current limiting resistor 27. The diodes 25 and 26 are chosen to pass current flowing in opposite directions and have a small forward voltage drop of about one-half volt, for example. When the A-C power supply is negative, current flows through the diode 26 causing the base of the clamping transistor 22 to be negative with respect to the emitter and, when the power supply is positive, current flows through the diode 25 causing the base to be positive with respect to the emitter, the clamping transistor 22 being rendered conductive when the base is positive with respect to the emitter since it is of the NPN type. Thus, when the power supply changes from a value of negative polarity to a value of positive polarity, the base-to-emitter voltage applied to the clamping transistor 22 changes from approximately a negative one-half volt to approximately a positive one-half volt so that the clamping transistor 22 is rendered conductive.

As previously mentioned, when the clamping transistor 22 is rendered conductive causing the left-hand terminal 17A of the capacitor 18 to be clamped ground, the switch operating one-shot multivibrator 23 is rendered nonconductive if a charge had previously been stored in the capacitor 18. The one-shot multivibrator 23 includes a pair of transistors 30 and 31, each having a base, an emitter and a collector, respectively designated as $b$, $e$ and $c$. The base of the transistor 31 is coupled to the collector of the transistor 30 through a coupling capacitor 32 so that the transistor 30 is normally conducting and the transistor 31 is normally nonconducting. The collectors of the transistors 30 and 31 are respectively connected to the D-C supply 13 through resistors 34 and 35 and the emitters thereof are connected to ground through a common resistor 36. The base of the transistor 30 is connected to the positive D-C source 13 through a resistor 37 and the previously mentioned resistor 35 so that the base is normally positive with respect to the emitter, causing transistor 30 to be normally conducting, and is connected to the right-hand terminal 17B of the capacitor 18, i.e., the negative terminal when charged. Aside from being coupled to the collector of transistor 30 through the capacitor 32, the base of transistor 31 is connected to ground through a resistor 38 which determines the base-to-emitter potential.

When a charge has been stored in the capacitor 18 and the clamping transistor 22 is rendered conductive so as to clamp the positive capacitor terminal to ground, the base of the one-shot multivibrator transistor 30 is driven negative with respect to the emitter so that transistor 30 is rendered nonconductive. When transistor 30 is rendered nonconductive, the collector thereof rises towards the value of the D-C source 13 so that the base of transistor 31, which is coupled thereto through the coupling capacitor 32, is driven positive with respect to the emitter and the transistor 31 is rendered conductive. When the transistor 31 is rendered conductive, the potential at the collector thereof drops due to the voltage drop across the resistor 35 and this negative-going potential controls operation of the previously mentioned triggering switch or transistor 24.

The triggering transistor 24 is of the PNP type having a base, an emitter and a collector, respectively designated as $b$, $e$ and $c$, and has its base connected to the collector of transistor 31 through a coupling capacitor 40. The collector of transistor 24 is connected to ground through a resistor 41 and the transistor is normally nonconductive since the base and emitter thereof are respectively connected to the D-C source 13 through resistors 42 and 43, a diode 44 being connected in series with the resistor 43 for temperature compensation. In response to the dropping collector potential of the transistor 31, the triggering transistor 24 is rendered conductive since a PNP transistor is rendered conductive when the emitter is positive with respect to the base.

The gate electrode of the silicon controlled rectifier 15 (static latching switch) is connected to the collector of the triggering transistor 24 and under normal conditions the gate electrode is at the same potential as the cathode, a resistor 41 being connected therebetween but no current flowing therethrough when the transistor 24 is nonconductive. When the triggering transistor 24 is rendered conductive, current flows through the resistor 41 causing the gate electrode to be driven positive with respect to the cathode, i.e., a triggering signal is applied to the gate electrode, so that the silicon controlled rectifier is conditioned for conduction. Since the A-C power supply is going positive at this time, the silicon controlled rectifier 15 is rendered conductive allowing current to flow through the resistive load 16.

Figure 2:
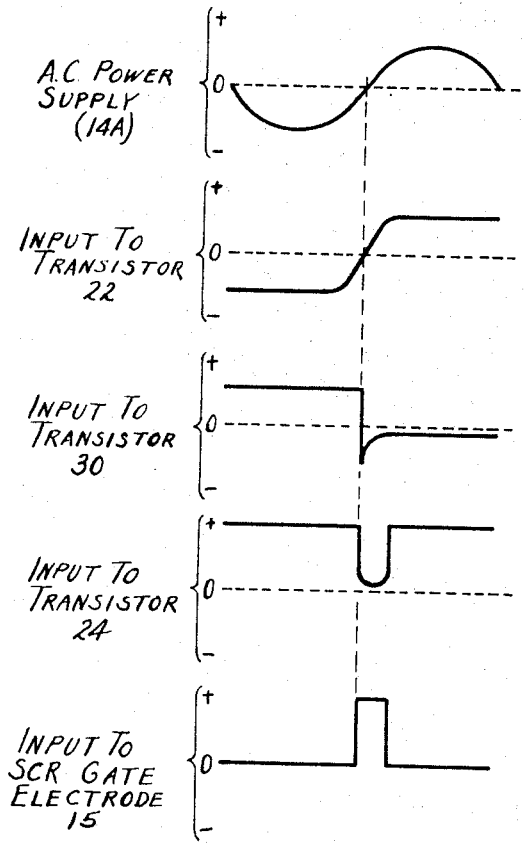
FIG. 2 illustrates wave forms at selected positions in the circuit illustrated in FIG. 1.

The general operation of the power proportioning circuit illustrated in FIG. 1 may be more clearly seen by reference to FIG. 2. During the time period when the output of the A-C power supply 14 is negative, the power proportioning circuit is in a quiescent condition since the input to clamping transistor 22 is negative as determined by the voltage drop across the diode 26 and the capacitor 18 will charge plus to minus, from left to right in FIG. 1, if a positive condition responsive signal is applied between the inputs 11 and 12. When the A-C power supply changes from a value of negative potential to a value of positive potential, i.e., passes through a zero phase angle, the input to the clamping transistor 22 changes from a negative value to a positive value as determined by the voltage drops across the diodes 25 and 26 so that the positive terminal of the capacitor 18 is clamped to ground and a negative input is applied to the switch operating, one-shot multivibrator transistor 30. The negative input to transistor 30 has a period determined by the time required for the capacitor to discharge through the resistor 20, which is connected thereacross when transistor 22 is conductive, and causes the first stage of the one-shot multivibrator 23 to be momentarily rendered nonconductive so that the second stage thereof is momentarily rendered conductive, i.e., transistor 30 is rendered nonconductive and transistor 31 is rendered conductive. In response to the momentary reversal of operation of the one-shot multivibrator 23, the base of the triggering transistor 24 is momentarily driven negative with respect to the emitter thereof so that the transistor 24 is momentarily rendered conductive and a triggering voltage is developed across the resistor 41 which is applied to the gate electrode of the silicon controlled rectifier and causes triggering thereof. Since the operation of the circuit in response to the clamping of the positive terminal of the capacitor 18 to ground is essentially instantaneous, the triggering signal is applied to the gate electrode of the silicon controlled rectifier 15 when the A-C power supply voltage passes through zero from negative to positive polarity and subsequently, when the power supply is positive, current is permitted to pass through the anode-cathode circuit thereof causing the resistive load 16 thereof to be energized since the triggering signal is sustained for a brief interval.

For sake of simplicity of description, delay in the turning on of the latching switch due to its storage time has been ignored. However, such devices do have definite storage times, typically of the order of 10 microseconds. Thus, it will be appreciated that, to cause the silicon controlled rectifier 15 to be rendered conductive exactly at the instant when the A-C power supply voltage goes through zero, the triggering pulse may have to be applied to its gate electrode a corresponding time before such zero crossing occurs. In view of the very small time involved, it will be seen that, even with such time advance, the triggering pulse would occur essentially when the power supply voltage goes through zero. Means for so advancing the time of occurrence of the pulse are well known to those skilled in the art.

A regenerative feedback circuit is associated with the capacitor 18 for causing a regenerative effect in response to nonconduction of the first stage of the one-shot multivibrator 23 whereby the first stage is positively and rapidly rendered nonconductive in response to the clamping of the positive capacitor terminal 17A to ground. The regenerative feedback circuit includes a diode 48 and a pair of resistors 49 and 50 connected between the collector of the transistor 30 and the left-hand terminal 17A of the capacitor 18 and includes a capacitor 51 connected between the common terminal of the resistors 49 and 50 and ground. When current flow through the transistor 30 begins to decrease and the potential at the collector begins to rise, a charging current begins to flow from the collector through diode 48 and resistor 49 to capacitor 51 so that the potential across the capacitor is proportional to the integral of the charging current. The potential on the capacitor 51 is limited by the voltage divider comprising resistors 34, 49 and 50. When the transistor 22 is turned off, part of the charge on the capacitor 51 is transferred to capacitor 18 through resistors 50 and 20 so that it aids the input signal in charging capacitor 18 and thus causes the base of transistor 30 to be driven further negative on the next operation of the transistor 22, resulting in a more rapid and positive cut-off of transistor 30 than would otherwise be obtained. This regenerative feedback is not an essential part of the present invention and so may be omitted.

In accordance with another aspect of the present invention, a control feedback network is provided in the power proportioning circuit for controlling the effect of the positive condition responsive signal applied between the input terminals 11 and 12 in order to compensate for the response time of a device being controlled, such as an airplane windshield, which responds to energization of the resistive load 16. The control feedback network includes a pair of capacitors 54 and 55, a pair of diodes 56 and 57 and a resistor 58. The components of the control feedback network are so arranged that, when the transistor 31 of the one-shot multivibrator 23 is nonconductive, the capacitor 54 charges plus to minus as shown to the potential of the D-C source 13 through the diode 57 and the resistor 35 and, when the transistor 31 is rendered conductive, the capacitor 55 is charged minus to plus as shown by the discharging of the capacitor 54 through the diode 56. Since the period of operation of the transistor 31 is momentary, only a small charge is stored in the capacitor 55 during each cycle of the A-C power supply voltage when the silicon controlled rectifier 15 conducts. The positive terminal of the capacitor 55 is connected to ground and the negative terminal thereof is connected through a resistor 58 to the left-hand terminal of the capacitor 18 so that the charge therein opposes the positive condition responsive signal applied to inputs 11 and 12. Thus, the capacitor 18 only charges to the differential potential between the condition responsive input signal and the charge on the capacitor 55 during each negative half cycle of the A-C power supply voltage. When the charge on the capacitor 55 has a sufficient amplitude, the charge provided in the capacitor 18 during the negative half cycle of the A-C power supply voltage will be so small that the transistor 30 in the one-shot multivibrator remains conductive when the positive terminal of the capacitor 18 is clamped to ground and further operation of the silicon controlled rectifier is inhibited until the capacitor 55 sufficiently discharges.

Thus, it may be seen that a power proportioning circuit has been provided for permitting current to flow through the resistive load 16 during a number of cycles of the A-C power supply voltage as determined by the time required to charge the capacitor 55 to a cutoff level and for prohibiting current flow through the resistive load 16 during a number of cycles of the A-C power supply voltage as determined by the time required for the capacitor 55 to discharge sufficiently below the cutoff level.

Referring to FIG. 3, a second power proportioning circuit 60 is illustrated which is also constructed in accordance with the present invention. The power proportioning circuit 60 is also designed to control the flow of current through a load during a number of cycles of an alternating power supply voltage. However, the power proportioning circuit 60 is designed to permit energization of the load during both the negative and positive half cycles of the alternating power supply voltage, whereas the power proportioning circuit in FIG. 1 only permits energization of the load during the positive half cycles of the alternating power supply voltage, though it would be obvious to one having ordinary skill in the art that the power proportioning circuit in FIG. 1 could be modified to permit energization of the load during both the positive and negative half cycles of the alternating power supply voltage.

A pair of static latching switches 61 and 62 are illustrated in FIG. 3 for controlling the flow of current from a power supply 63 through a resistive load 64 similar to the resistive load 16 in FIG. 1, the static latching switch 61 being provided to permit current flow during the positive half cycles of the A-C power supply voltage and the static latching switch 62 being provided to permit current flow through the load during the negative half cycles of the A-C power supply voltage. Preferably, the static latching switches 61 and 62 are silicon controlled rectifiers having anodes, cathodes and gate electrodes, respectively designated as $a$, $c$ and $g$. In response to the application of a positive triggering signal to the gate electrodes, the silicon controlled rectifiers 61 and 62 are conditioned for conduction which will be sustained therethrough as long as the A-C power supply voltage is of the correct polarity. As previously mentioned, once a silicon controlled rectifier is rendered nonconductive, a subsequent triggering signal is required to again condition it for conduction. The output of the resistive load 64 may also be utilized to control the operation of any desired device such as controlling the temperature of an aircraft windshield.

In accordance with the present invention, the triggering signal, which is briefly applied to the gate electrode of the transistor 61, overlaps with the changing of the polarity of the A-C power supply voltage from negative to positive. Thus, the silicon controlled rectifier 61 will be rendered conductive when the A-C power supply voltage passes through zero.

An emitter-coupled differential-amplifier and a bridge circuit are provided for responding to a positive condition responsive input signal to control the operation of a triggering transistor 66 which, when rendered conductive, causes a triggering signal to be applied to the gate electrode of the silicon controlled rectifier 61. The emitter-coupled differential-amplifier includes a pair of transistors 67 and 68 having their emitters connected to ground through a common resistor 69, having their bases connected to output terminals of the bridge circuit, and having their collectors connected to the A-C power supply 63 through resistors 70 and 71 and through a phase-shifting capacitor 74. The bridge circuit includes three resistors 75, 76 and 77 having constant values and a variable resistor 78 which varies in accordance with the varying of a prescribed condition, such as the change in temperature of an aircraft windshield. The input terminals of the bridge circuit are respectively connected to ground and to the A-C power supply 63 through the phase-shifting capacitor 74, and a shorting diode 80 is connected across the bridge circuit input to short out the negative half cycles of the A-C power supply voltage. The phase-shifting capacitor 74 is provided to change the phase of the input applied to the emitter-coupled differential-amplifier and the bridge circuit so that the input to a common input terminal 73 thereof leads the voltage of the A-C power supply 63 by 90°.

A bias voltage determined by the charge on a feedback control capacitor 81 is applied to the base of the transistor 68 in the differential amplifier through a resistor 82. During quiescent conditions of the power proportioning circuit when no condition is detected by the variable resistor 78 and the silicon controlled rectifier 61 is nonconductive, the feedback control capacitor 81 is charged by the positive half cycles of voltage at the A-C power supply 63 through the resistive load 64, a diode 83 and a resistor 84. Thus, the capacitor 81 is normally charged to the peak supply voltage level. Under normal conditions, the output of the bridge circuit compensates for the bias voltage and the transistors 67 and 68 conduct equally so that the same voltage drop is developed across resistors 70 and 71. The emitter of the triggering transistor 66 is connected to the collector of transistor 67, the base thereof is connected to the collector of transistor 68, and the collector thereof is cnnected to ground through a resistor 85. When the transistors 67 and 68 are equally conducting, the collectors are at the same potential due to the same voltage drop being developed across the resistors 70 and 71 so that a zero differential voltage is provided between the emitter and base of the triggering transistor 66 and the transistor 66 is nonconductive. When a condition is detected by the condition responsive resistor 78, the resistance thereof changes causing the bridge circuit to be unbalanced so that the right-hand output terminal is positive with respect to the left-hand output terminal, as illustrated in FIG. 3, and the base of transistor 68 is positive with respect to the base of transistor 67. Under these conditions, transistor 68 conducts more heavily than transistor 67 so that a greater voltage drop is developed across resistor 71 than resistor 70 and the collector of transistor 68 is at a lower potential than the collector of the transistor 67. This causes the triggering transistor 66 to be rendered conductive since it is of the PNP type. In response to conduction of the triggering transistor 66, a triggering voltage is developed across the resistor 85 which is applied to the gate electrode of the silicon controlled rectifier 61 which conditions the silicon controlled rectifier for conduction. Subsequently, when the A-C power supply voltage passes through zero from negative to positive, the silicon controlled rectifier 61 is rendered conductive so that current flows through the resistive load 64 causing the load to be energized.

When the load is energized, a capacitor 90 connected across the load through a diode 91 is charged plus or minus as shown. When the A-C power supply voltage begins to drop from its peak toward zero value during the positive half cycle thereof, the capacitor 90 gradually discharges through resistors 92 and 93 and a plus to minus voltage drop is developed across the resistor 93 which is applied to the gate electrode of the silicon controlled rectifier 62 and causes triggering thereof. Subsequently, when the A-C power supply voltage goes negative, the silicon controlled rectifier 62 is rendered conductive so that current flows through the resistive load 64 to maintain the load energized during the negative half cycle of the power supply voltage.

The number of succeeding cycles of the A-C power supply voltage in which the silicon controlled rectifiers 61 and 62 are rendered conductive is controlled by the charge on the feedback control capacitor 81. As previously mentioned, the feedback control capacitor 81 charges to the peak A-C power supply voltage level during quiescent conditions of the circuit so that the charge therein biases the transistor 68. During the positive half cycles of the A-C power supply voltage when the silicon controlled rectifier 61 is rendered conductive, the feedback control capacitor 81 discharges through resistor 84 and the silicon controlled rectifier 61 so that the charge therein is gradually dissipated during each cycle of operation of the silicon controlled rectifiers. This dissipation of charge continues until the potential at the base of the transistor 68 is reduced a sufficient amount so that the transistors 67 and 68 again conduct equally and the transistor 66 is rendered nonconductive, the silicon controlled rectifiers not being triggered for conduction during subsequent cycles of the A-C power supply voltage while the bridge balance exists. During the time period when the silicon controlled rectifiers are not triggered for conduction, the feedback control capacitor 81 will again charge toward the peak voltage level of the A-C power supply and, if the condition detected has not been completely compensated for, the cycle will again repeat. The power proportioning circuit 60 will cycle until no condition is detected by the condition responsive resistor 78, i.e., current will flow through the resistive load 64 during a number of cycles and then will be prevented from flowing therethrough for a number of cycles.

A better understanding of the general operation of the power proportioning circuit 60 may be had by reference to FIG. 4. The nonsolid sine wave 100 in FIG. 4 depicts the voltage of the A-C power supply 63 and the solid sine wave 101 depicts the input provided at terminal 73, the phase-shifting capacitor 74 causing the sine wave at terminal 73 to lead the voltage of the A-C power supply by 90°. When the bridge circuit is unbalanced in response to the detection of a condition by the condition responsive resistor 78, the transistor 68 conducts more heavily than the transistor 67 during the cross-hatch portion of the wave 101 so that the triggering transistor 66 is rendered conductive and a positive voltage corresponding to the cross-hatch portion of the sine wave 101 is provided across the resistor 85 for the duration of the half cycle, the positive voltage developed thereacross triggering the silicon controlled rectifier 61 to condition it for conduction. Subsequently when the A-C power supply voltage, depicted by sine wave 100, passes through zero, i.e., changes from a value of negative potential to a value of positive potential, the silicon controlled rectifier 61 is rendered conductive since the positive triggering signal is still being applied to the gate electrode thereof and the silicon controlled rectifier 61 will conduct throughout the positive half cycle of the A-C power supply voltage. During the positive half cycle of the A-C power supply voltage when the silicon controlled rectifier 61 is conducting, the silicon controlled rectifier 62 is conditioned for conduction by the discharging of the capacitor 90 and, when the A-C power supply voltage goes negative, the silicon controlled rectifier 62 is rendered conductive. As previously mentioned, the feedback control capacitor 81 discharges when the silicon controlled rectifier 61 is rendered conductive so that the charge therein is gradually dissipated during successive cycles of operation of the power proportioning circuit. When the charge in the feedback control capacitor 81 is reduced a sufficient amount, the transistors 67 and 68 again conduct equally so that the triggering transistor 66 is rendered nonconductive and operation of the silicon controlled rectifiers is inhibited. During the inhibition period, the feedback control capacitor 81 is again charged and, if the condition is still detected, the cycle repeats itself.

Referring to FIG. 5, wave forms illustrating the flow of current through the resistive load 64 of the power proportioning circuit 60 are shown for various loading conditions of operation of the power proportioning circuit. Under certain conditions, the full supply wave form will be applied to the resistive load 64, this being a 100% loading condition. Under a 25% loading condition, current would flow through the resistive load 64 one cycle out of every four cycles; under a 50% loading condition, current would flow through the resistive load 64 two cycles out of every four cycles; and, during a 75% loading condition, current would flow through the resistive load 64 three cycles out of every four cycles. During actual operation of the power proportioning circuit 60, the comparison of the number of cycles when current flows through the load versus the number of cycles when current does not flow through the load are completely dependent upon the circuit parameters and the condition detected and, therefore, the actual ratio is unpredictable, the power proportioning circuit computing in and of itself the necessary ratio to overcome the condition detected.

Thus, it may be seen that power proportioning circuits have been provided for controlling the periods of supply and nonsupply of A-C power to a resistive load or the like while having little distorting effect on the supply wave form, full half cycles or full cycles of an alternating input wave being applied to the load during the period of supply. The output of the load may in turn be utilized to control the operation and nonoperation of a control device or the like so that in essence the power proportioning circuits control the periods of operation and nonoperation of the control device.

Further, it may be seen that power proportioning circuits have been provided which may be readily utilized in commercial and industrial applications, such as aircraft, telemetry, missile, space probe and satellite operations, wherein it is desirable for circuits of this type to generate very little electrical interference, such as radio noise, when switching from nonsupply of power to supply of power. In the instant case, the power proportioning circuits operate to render static latching switches operative, i.e., to render silicon controlled rectifiers conductive, only when the power supply voltage wave form is passing through zero in changing from negative to positive polarity. Very little electrical interference or radio noise is generated by a switching element of this type when it is rendered conductive while the power supply voltage applied thereto has a value of essentially zero amplitude, whereas, if the switching element is rendered conductive when the power supply voltage has a substantial amplitude (a steep input wave front to the load) substantial electrical interference or radio noise will be generated. Additionally, it may be seen that power proportioning circuits have been provided for extending the life of the switching elements utilized therein. As is well known in the art, switching elements of the silicon controlled rectifier type are sensitive to the input wave front applied to the load upon triggering and the longevity of these switching elements may be increased by only triggering the switching elements when the input wave front is essentially zero in amplitude, triggering signals having steep wave fronts and input signals having zero wave fronts being desirable for ideal switching operations.

Accordingly, it may be seen that power proportioning circuits have been provided which may be utilized for controlling operations, such as controlling the temperature of aircraft windshields, while maintaining smooth control and while generating very little radio noise so that the windshield is placed in little stress due to temperature deviations and a smaller filter may be utilized in conjunction with the aircraft radio system.

I claim as my invention:

1. In a power proportioning circuit, having a pair of input terminals for controlling a supply of alternating power to a load or the like, as a function of a variable voltage signal between said terminals, the combination which comprises a static latching switch for connecting the alternating power supply to the load when rendered operative, a differential amplifier coupled to said input terminals for amplifying said signal, triggering means responsive to said amplified signal for rendering the static latching switch operative when the alternating power supply passes through zero voltage in a prescribed direction so that subsequently the load is energized by a half cycle of the alternating power supply voltage having a prescribed polarity, and a feedback loop coupled from said latching switch to one of said terminals for counteracting the effect of said signal upon the triggering means after a prescribed period of time to cause said static latching switch to be left unactivated for another prescribed period of time.

2. In a power proportioning circuit for controlling a supply of cyclically alternating voltage to a load or the like, the combination which comprises a static latching switch for connecting the alternating voltage to the load when rendered operative, means including a bridge circuit for producing a variable voltage signal between a pair of terminals in response to unbalance of said bridge circuit, a differential amplifier coupled to said pair of terminals for amplifying said signal, triggering means responsive to said amplified signal and to said alternating voltage for rendering the static latching switch operative when the alternating voltage passes from a value of one polarity to a value of the other polarity so that the load is subsequently energized by the voltage having the other polarity, and a feedback loop connected between said latching switch and one of said terminals for counteracting the effect of said signal upon the triggering means so that after the static latching switch has been operated during a prescribed number of succeeding cycles of the alternating voltage the triggering means is left unactivated for a prescribed number of succeeding cycles.

3. In a power proportioning circuit for controlling a supply of a cyclically alternating voltage to a load or the like, a combination which comprises, a static latching switch for connecting the voltage supply to the load when rendered operative, means including a pair of output terminals and a bridge circuit having a condition sensitive arm, said bridge circuit producing at said output terminals an unbalance signal whose magnitude is a function of the condition to which said arm is subjected, a differential amplifier coupled to said output terminals for providing an output in response to said unbalance signal, control means responsive to the differential amplifier output for rendering the static latching switch operative so that the load is energized by a half cycle of the alternating voltage supply, and feedback means responsive to operation of the static latching switch for applying a signal to said differential amplifier in opposition to said unbalance signal such that when the static latching switch has been operative during a prescribed number of succeeding half cycles of the alternating voltage supply the unbalance signal of the bridge is temporarily negated and said differential amplifier is prevented from causing said static latching switch to be rendered operative for a prescribed number of succeeding cycles.

4. The combination of claim 3 wherein said feedback means includes a capacitor, means for charging said capacitor while said latching switch is inoperative, means for discharging said capacitor while said latching switch is operative, and means for applying at least a fraction of the voltage across said capacitor to said differential amplifier in opposition to the unbalance signal of said bridge.

5. The combination of claim 3 wherein said feedback means includes a capacitor connected across the anode and the cathode of said latching switch so that the capacitor is charged while said latching switch is inoperative and is discharged while said latching switch is operative and means for applying at least a fraction of the voltage established by the charge accumulated on said capacitor to said differential amplifier in opposition to the unbalance signal produced by said bridge.

6. The combination of claim 4 additionally including a second static latching switch and means operative in response to the operation of said first static latching switch for rendering said second static latching switch operative 180 degrees out of phase with said first latching switch.

References Cited

UNITED STATES PATENTS

| | | | |
|---|---|---|---|
| 2,953,738 | 9/1960 | Bright | 321—47 |
| 3,042,781 | 7/1962 | Bray | 219—501 X |
| 3,070,739 | 12/1962 | Hansen et al. | 321—47 |
| 3,175,076 | 3/1965 | Fox et al. | 219—494 |
| 3,175,077 | 3/1965 | Fox et al. | 219—494 |
| 3,192,466 | 6/1965 | Sylvan et al. | 323—22 |
| 3,196,255 | 7/1965 | Beauchamp et al. | 219—497 |
| 3,204,113 | 8/1965 | Snygg | 307—88.5 |
| 3,214,677 | 10/1965 | Baude | 323—22 |
| 3,270,273 | 8/1966 | Mills | 321—47 |

JOHN F. COUCH, *Primary Examiner.*

W. E. RAY, W. H. BEHA, *Assistant Examiners.*